United States Patent Office.

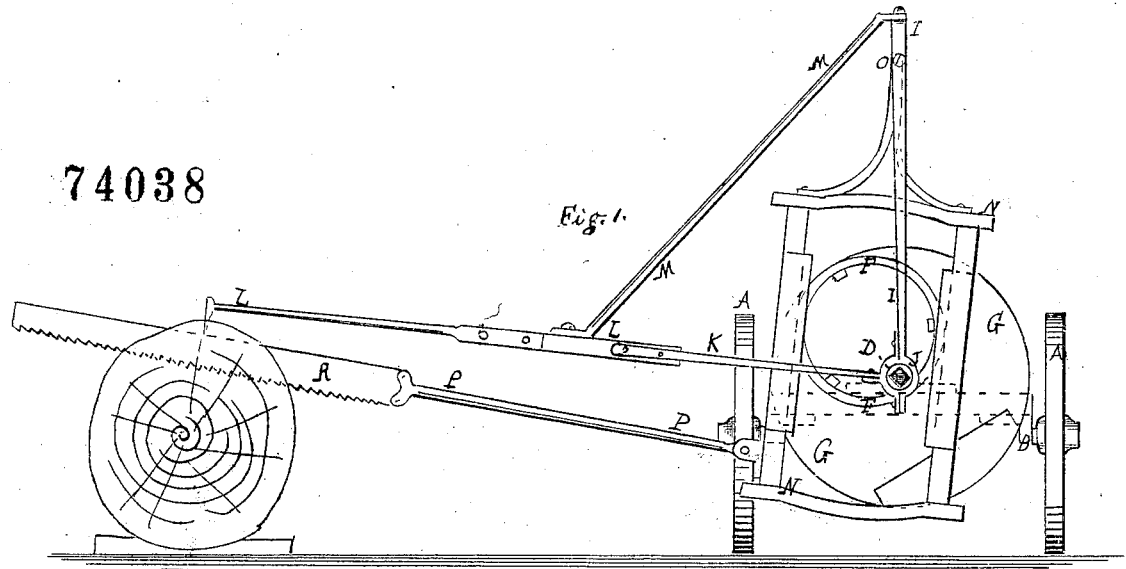
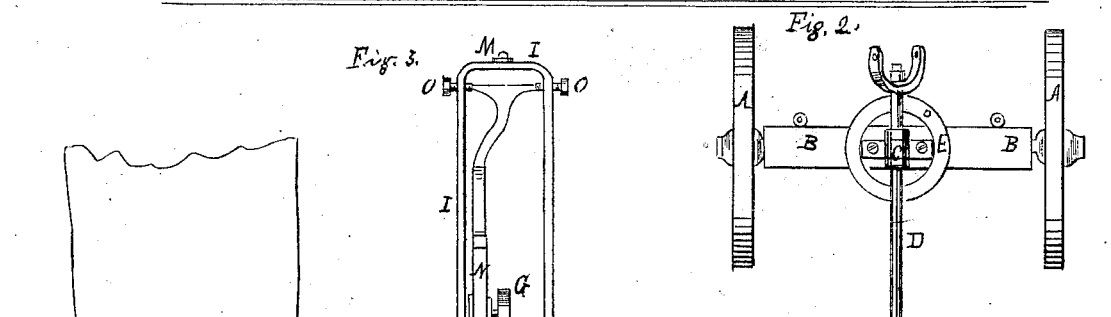
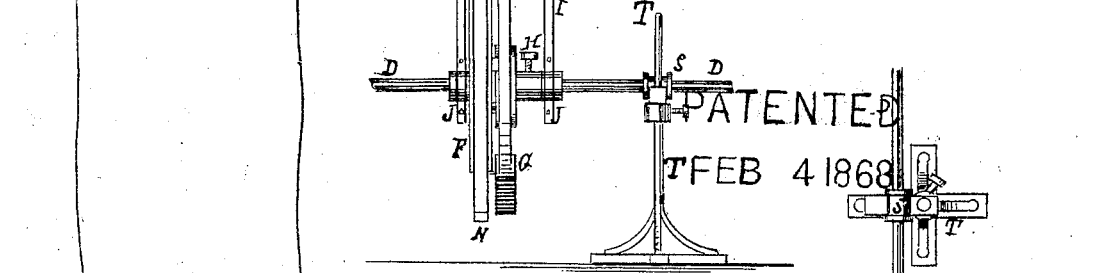
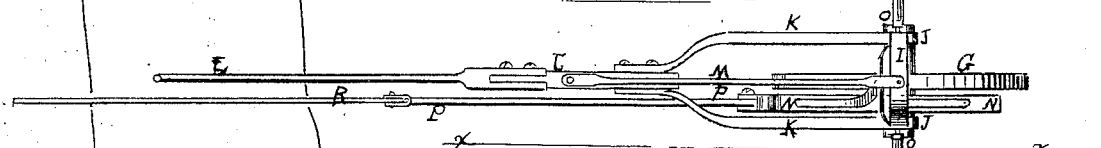

G. W. BELL, OF RISING SUN, INDIANA.

*Letters Patent No. 74,038, dated February 4, 1868.*

---

IMPROVEMENT IN SAWING-MACHINES.

---

*The Schedule referred to in these Letters Patent and making part of the same.*

---

TO ALL WHOM IT MAY CONCERN:

Be it known that I, G. W. BELL, of Rising Sun, in the county of Ohio, and State of Indiana, have invented a new and useful Improvement in Portable Sawing-Machine; and I do hereby declare that the following is a full, clear, and exact description thereof, which will enable others skilled in the art to make and use the same, reference being had to the accompanying drawings, forming part of this specification, in which—

Figure 1 is a vertical section of my improved machine, taken through the line $x\ x$, fig. 2.

Figure 2 is a top view of the same.

Figure 3 is a detail view, showing the manner in which the pendulum-frame is pivoted.

My invention has for its object to furnish a simple, cheap, and portable machine, by means of which timber for shingles, staves, fire-wood, &c., may be sawn in the woods, without its being necessary to incur the expense and labor of transporting the logs to a machine, as is now the case; and it consists in the combination of the eccentric and balance-wheels, pendulum-frame, supporting-frame, and jointed dog with each other and with the long shaft; in the combination of sliding bearings and adjustable support with the long shaft, the whole being constructed and arranged as hereinafter more fully described.

A are the wheels, and B are the axles, to which the bearings C of the long shaft D are attached. The bearings C are both attached to the axles by means of a turn-plate or centre-wheel, E, so that either one may be used for a forward axle for convenience in transporting the machine through the timber. The shaft D is made of such a length that the logs may be sawn without shifting the position of the machine, the saw being shifted from one cut to another by sliding it along the shaft D. The ends of the shaft D may be connected to the tumbling-rod of the horse-power by a universal joint, in the usual manner. F is the eccentric-wheel, which is bolted or otherwise secured to the balance-wheel G. The hub of the balance-wheel G slides freely along the shaft D, and may be secured in any desired position by the set-screw H. I is a frame, the lower ends of the side bars of which have sleeves, J, formed upon or attached to them, which ride upon grooves formed in the hub of the wheel, as shown in figs. 2 and 3. K are brace or connecting-bars, the rear ends of which are attached to the sleeves J, and their forward ends to the shank of the dog L. M is a brace-bar, the forward end of which is attached to the shank of the dog L, and its upper end to the top of the frame I, so that the frame I and dog L are rigidly connected together. The shank of the dog L is jointed, so that, by removing a bolt, it may be turned up out of the way while transporting the machine from place to place. N is a frame, upon the inner edges of the side bars of which are formed grooves, in which the eccentric-wheel F works, so that, by the revolution of said eccentric-wheel, the frame N may be moved back and forth. To the upper end of the frame N is attached the lower end of the pendulum-rod $n'$, the upper end of which is pivoted to the upper part of the frame I by pivoting screws O, so that it may be detached, when desired. To the lower part of the side of the frame N is pivoted the rear end of the saw-pitman P, to the forward end of which is attached the saw-blade R. S are sliding bearings, placed upon the shaft D, upon each side of the wheel G and its attachments, and secured in such a way that they may slide freely back and forth along the shaft, but will be carried with it in its revolution. T is a support, upon which one or the other of the bearings S may revolve, to support the shaft D and hold it steady while the machine is being operated. The support T is made adjustable, so that it may be adjusted according to the inequalities of the ground.

What I claim as new, and desire to secure by Letters Patent, is—

1. The construction and arrangement of the eccentric-wheel F, balance-wheel G, pendulum-frame N, supporting-frame I, jointed dog L, shaft D, and brace or connecting-bars K and M, as herein described for the purpose specified.

2. The sliding bearings S, constructed as described, fitting upon the square shaft D, and turning freely in the box upon the upright T, said box adjusted upon the upright by means of the sliding sleeve and set-screw, as herein shown and described.

3. The combination of one or more adjustable supports T with the sliding bearings S and shaft D, constructed and operating substantially as herein shown and described and for the purpose specified.

G. W. BELL.

Witnesses:
   H. T. WILLIAMS,
   J. W. PEARSON,
   O. H. MILLER.